(12) United States Patent
Hino et al.

(10) Patent No.: US 7,198,564 B2
(45) Date of Patent: Apr. 3, 2007

(54) DEBONING SYSTEM OF MEAT

(75) Inventors: Kazuchika Hino, Koto-ku (JP); Tatsuya Umino, Koto-ku (JP); Keizo Hamano, Koto-ku (JP); Junichi Akao, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 11/196,501

(22) Filed: Aug. 3, 2005

(65) Prior Publication Data

US 2006/0030250 A1 Feb. 9, 2006

Related U.S. Application Data

(63) Continuation of application No. PCT/JP03/01056, filed on Feb. 3, 2003.

(51) Int. Cl.
*A22C 17/02* (2006.01)

(52) U.S. Cl. ..................................... 452/135

(58) Field of Classification Search ........ 452/135–140, 452/148, 149–157, 166–170
See application file for complete search history.

(56) References Cited

U.S. PATENT DOCUMENTS

| | | | | |
|---|---|---|---|---|
| 3,882,570 A | * | 5/1975 | Zwiep et al. ................ | 452/154 |
| 4,918,788 A | * | 4/1990 | Passchier .................... | 452/135 |
| 5,226,850 A | * | 7/1993 | Klaassen .................... | 452/171 |
| 5,462,477 A | * | 10/1995 | Ketels ......................... | 452/135 |
| 5,597,351 A | * | 1/1997 | Queally et al. ............. | 452/135 |
| 5,713,787 A | * | 2/1998 | Schoenmakers et al. .... | 452/136 |
| 6,106,384 A | * | 8/2000 | Mutoh et al. ................ | 452/135 |
| 6,148,012 A | * | 11/2000 | Capasso et al. ........ | 372/45.012 |

FOREIGN PATENT DOCUMENTS

| JP | 10-286057 A | 10/1998 |
|---|---|---|
| JP | 11-56226 A | 3/1999 |
| JP | 2000-106818 A | 4/2000 |
| JP | 2001-120165 A | 5/2001 |
| JP | 2002-238444 A | 8/2002 |

* cited by examiner

*Primary Examiner*—Thomas Price
(74) *Attorney, Agent, or Firm*—Rossi, Kimms & McDowell LLP (57) ABSTRACT

A deboning system of meat for a small or intermediate processing factory in which the space is saved while reduction the cost by limiting the processing range of a work thereby limiting the processing functions to those of high necessity. The deboning system of meat comprises a shoulder blade boning station (11) having a specified interval from a charging station (10) and a humerus deboning station (12) having the same interval disposed sequentially and linearly at a constant interval on the downstream side of the charging station (10). A station (13) for discharging the humerus is disposed on the downstream side of the humerus deboning station (12) and a work is tact-carried while being hanged through fixed and movable carrying passages. The work is deboned during the carrying process, and deboned humerus is discharged from a final station (discharging station) (13).

7 Claims, 11 Drawing Sheets

DEBONING SYSTEM OF MEAT

This application is a continuation of PCT/JP2003/001056 filed Feb. 3, 2003.

TECHNICAL FIELD

Figure 11:
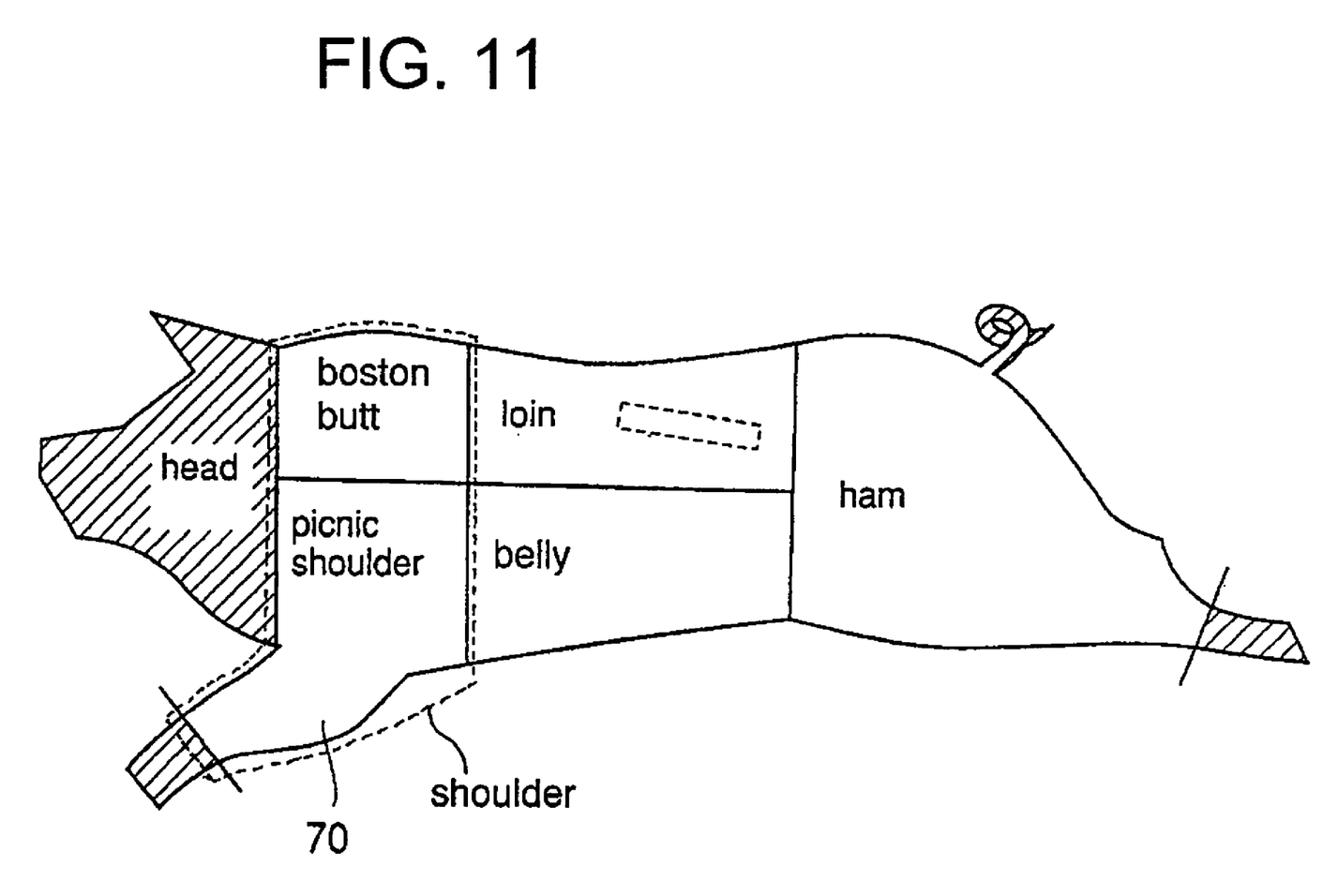
FIG. 11 is a drawing to show parts partitioning a dressed carcass of a pig.

The present invention relates to a deboning system of a picnic shoulder 70 among dressed carcass blocks of a pig, beef cattle, horse, sheep, goat, etc. halved along the backbone thereof and divided as shown in FIG. 11 in preprocessing, particularly a small sized deboning system for automatically separating meat by ripping off the shoulder blade and upper arm bone(humerus), in which cuts are marked around the humerus and shoulder blade to a block with the boston butt and spareribs being separated and the forearm bones(ulna and radius) being removed, thus a minimum deboning process is performed to the picnic shoulder obtained by preprocessing maximally the dressed carcass as mentioned above.

BACKGROUND ART

Conventionally, deboning of a dressed carcass halved along the backbone has been performed in the case of a pig or beef cattle such that the dressed carcass halved along the backbone is divided into five blocks, a shoulder, loin, belly, ham, and fillet in a meat processing plant and deboned.

A deboning system of a left or right half block of dressed carcass of a pig, sheep, etc. halved along the backbone is disclosed in Japanese Laid-Open Patent Application No. 10-286057.

Figure 8:
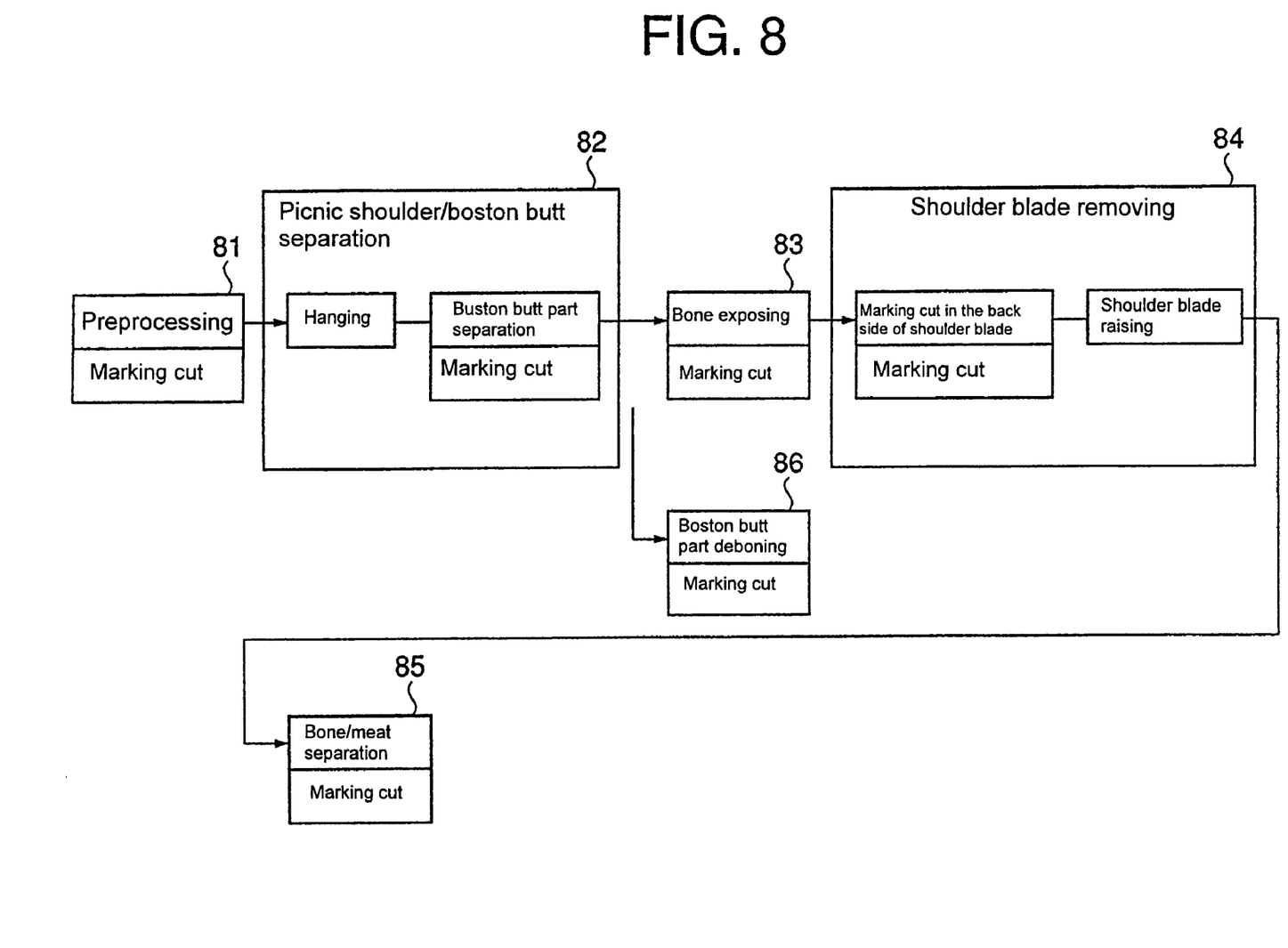
FIG. 8 is a block diagram of a conventional deboning system of a half block of shoulder part of dressed carcass of a pig.

As shown in FIG. 8, the system for deboning the shoulder part block of the halved carcass is composed of a preprocessing step 81, picnic shoulder/boston butt separating step 82, bone exposing step 83, shoulder blade removing step 84, bone/meat separating step 85, and boston butt part deboning step 86.

The system is constituted such that the processing on a dressing table is decreased to a minimum, deboning operation is performed while hanging the work (meat block to be deboned), and a series of power-driven supplementary operations and manual operations to mark cuts are combined organically for controlling and retaining of the attitude of the work, exposing of substantial part to be severed, and disjointing of an exposed joint.

A method of deboning a left or right half block of thigh (ham) of a pig halved along the backbone is disclosed in Japanese Laid-Open Patent Application No. 11-056226.

Figure 9:
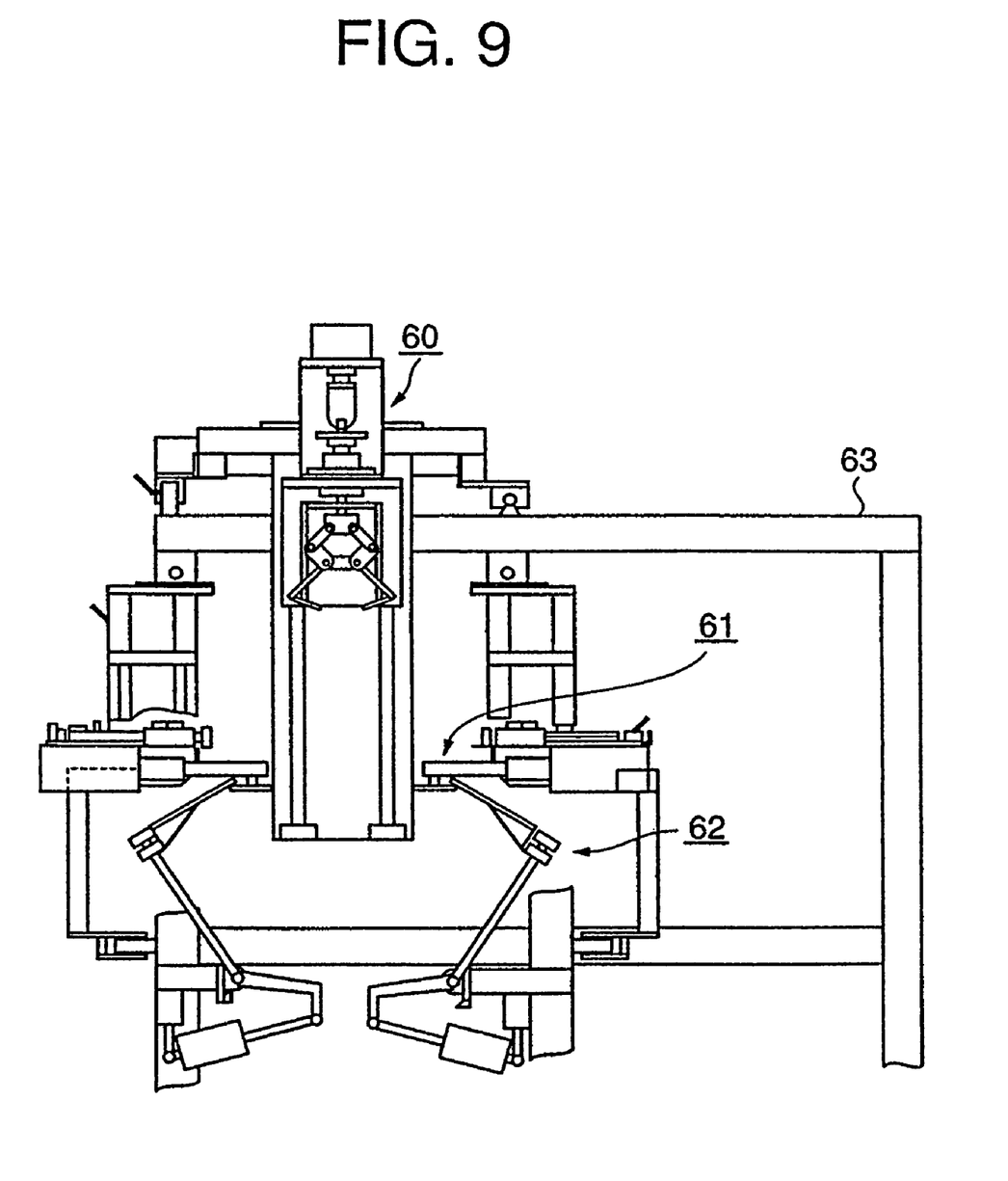
FIG. 9 is a view schematically showing a conventional deboning system of a pig thigh.

As shown in FIG. 9, the method of deboning consists of an attitude control apparatus 60 for controlling a hanged work including a clamp to hold the work, a pair of left and right cutters 61, a plurality of meat separators 62, and a transfer line 63.

The system is constituted such that the weight of meat is effectively utilized to rip off meat sanitarily from around bones, a plurality of supplementary means using actuators are provided while utilizing gravitational force, and manual operation is limited to marking cuts to relevant parts, thus labor-saving deboning is realized.

Further, in Japanese Laid-Open Patent Application No. 2001-120165 is proposed by the applicant of the present invention apparatuses and a system using the apparatuses for deboning a left or right half block of picnic shoulder/boston butt halved along the backbone of dressed carcass of a pig, etc.

Said disclosure proposes a deboning system of high yield ratio for deboning all over the picnic shoulder/boston butt of a pig, in which deboning is performed automatically for the most part with cuts marked manually only partly.

Figure 10:
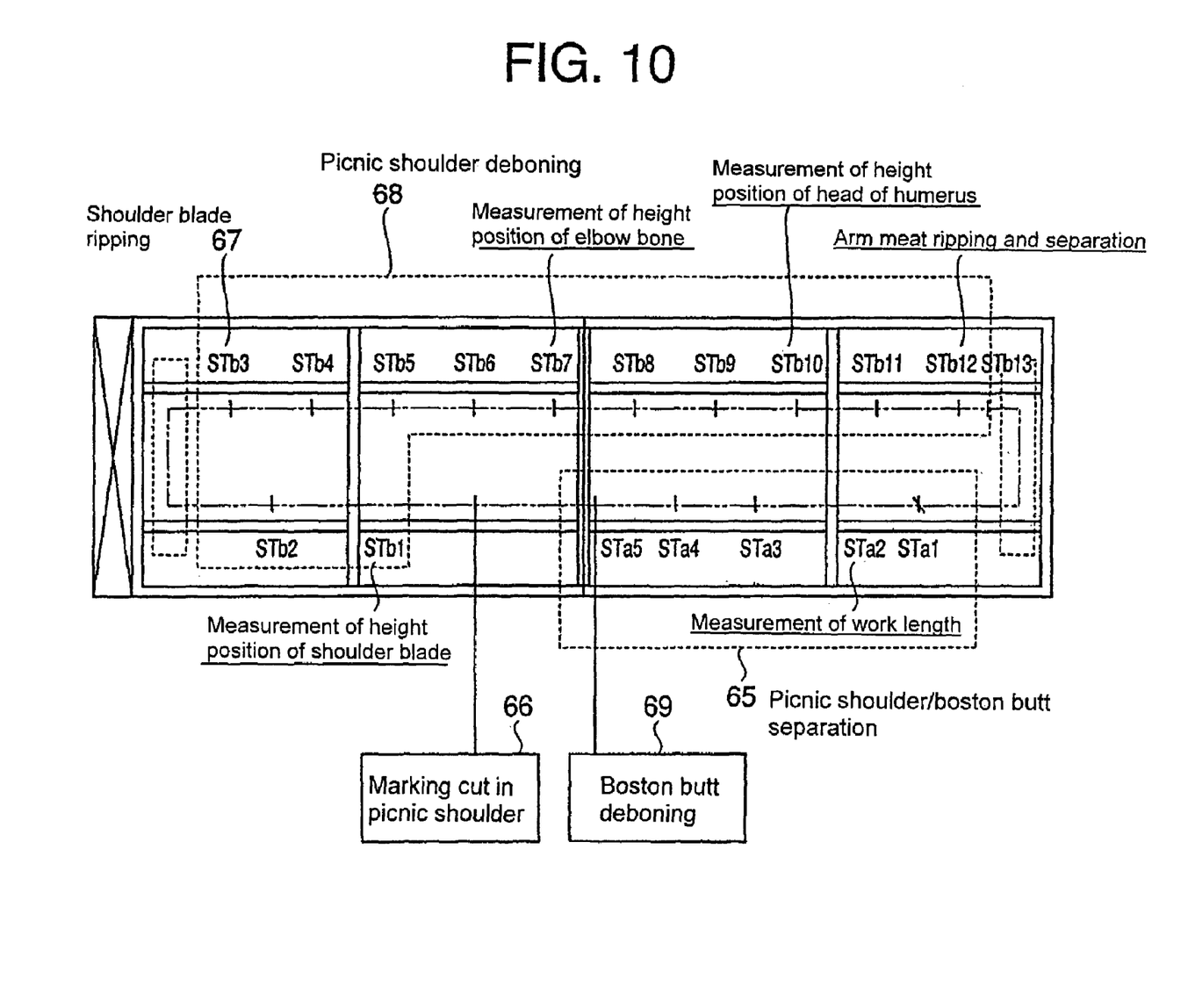
FIG. 10 is a representation showing the flow of processing of a conventional picnic shoulder/boston butt block deboning system.

The system consists, as shown in FIG. 10, of an automatic picnic shoulder/boston butt separating step 65 for separating the boston butt part from the picnic shoulder part after preprocessing of marking cuts is done manually, an cut marking step 66 for marking cuts manually to the remaining shoulder part, an automatic shoulder picnic deboning step 68 including a shoulder blade ripping step 67 executed after the cuts are marked, and a boston butt part deboning step 69 for deboning the boston butt part separated in the step 65.

The boston butt part (work) is transferred in a hanged attitude, size measurements of relevant parts of the work are made at station STa2, STb1, STb7, and STb10 while the work is transferred on a line to determine optimal positions of the work and cutters for the work to be treated, and the work and cutters are moved to the optimal position to debone the work sequentially effectively. Therefore, the deboning can be performed mostly automatically with cuts marked manually only partly.

As mentioned above, the conventional deboning line is constituted such that cuts are marked to the work such as a shoulder part, ham part, etc. of dressed carcass manually to a minimum and the remaining deboning operations such as marking cuts, severing, ripping off of meat or deboned are performed automatically while the work is hanged.

In said automatic deboning operation, it is necessary to separate the boston butt part in order to remove the shoulder blade. To separate the boston butt part from the arm/shoulder block (work) hanged with the end part of the arm being held by a clamp, the attitude of the work is controlled so that the cut surface of the block is on an inclination of 60° to a horizontal plane, the length from the reference position at the end part of the clamp to the lower extremity of the block (work) is measured, and the cutter is moved to a position most suitable for cutting on the basis of the measured length. Particularly, the position to sever and separate the shoulder part from the arm part is determined based on said detected length of the work to minimize the error concerning the separation position due to the difference in size of individual work.

Then, after cuts are marked to the shoulder, upper face of the humerus, side face of the humerus, and right side face of the shoulder blade, and around the shoulder blade of the hanged work, the height position of the shoulder blade (the first reference value for the arm part from the reference position) is measured. Then, the shoulder blade is ripped off in the next step.

Further, the length from the reference position to the end of the humerus (the second reference value for the arm part from the reference position) is measured to prevent disjointing of the joint between the forearm bones and the humerus.

As mentioned above, the work is transferred in a hanged attitude to the apparatus of each step provided along the line, size measurements of the work are made at relevant steps, optimum positions for the work and cutters are determined on the basis of the measurements, the work and cutters are moved automatically to the optimum positions, and deboning operations are performed sequentially.

By the way, the measurement of the length of the work from the reference position (at the lower end part of the clamp) to the lower extremity of the work is necessary when severing the boston butt part, the first reference value indicates the height position of the shoulder blade calculated based on the reference position, and the second reference value indicates the height position of the end of the forearm bones. The measurements are made for eliminating errors concerning the severing position to separate the shoulder part, and the errors are caused by the difference in lengths of the forearm bones and the humerus of individual work. Therefore, if the boston butt part is separated manually beforehand, it becomes unnecessary to measure the length of the work, and the first and second reference value for the arm part.

Particularly, in said automatic deboning system to perform full deboning of a picnic shoulder/boston butt part of a pig after cuts are partly marked manually, a shoulder part of a pig including halved vertebrae and breast bones, a humerus, a shoulder blade, a radius, and a ulna is hung from a platform car, and the forearm bones, humerus, shoulder blade, vertebrae, breast bones, and ribs are deboned. The wagon car is placed on a pair of transfer rails (transfer line), and the wagon car clamps the shoulder part (work) and moves on the transfer line every time processing is completed at every station. The transfer line is formed to be a closed line.

The deboning system is a nearly impeccable system, but there are problems of high cost and large space demanding for installation, and a deboning system suitable for small-to-medium scale food processing factories is expected.

DISCLOSURE OF THE INVENTION

The present invention is made in light of the problems mentioned above and aims to provide such a small-sized deboning system of space-saving and low cost suitable for small-to-medium scale food processing factories that has the function of implementing highly necessary treatment by limiting processing range to a minimum and is provided with a work transfer mechanism commensurate with the small-sized system in which deboning operation is done sequentially.

To achieve the object, the present invention proposes a deboning system of meat in which a picnic shoulder part of a meat block of a dressed carcass halved along the backbone is deboned in a state the meat block is hanged, wherein are provided a charging station of the meat block, a plurality of deboning stations for deboning the meat block, and a bone discharging station, and a group of transfer means consisting of a plurality of transfer paths including fixed transfer paths and movable transfer paths extending through said stations, initial horizontal positions being determined on the transfer paths, the meat block (hereafter referred to as work) being held in a hanged attitude at each of said initial horizontal positions, the movable transfer paths being provided in the deboning stations, said movable paths being able to be moved to move the work held in a hanged attitude at each of the initial horizontal positions on each of the movable transfer paths to a deboning section provided in the corresponding station in order to perform required deboning operation, said transfer means group including the fixed transfer paths and movable transfer paths and an intermittent feeding means to push intermittently the work held at each of the initial horizontal positions from a preceding station to succeeding station.

The deboning system of meat of the present invention mentioned above makes it possible to provide a space-saving, low cost deboning system in which processing capacity is limited to a minimum necessary processing range and with which maximum investment efficiency can be achieved. The system relates to deboning processing of a meat block of picnic shoulder part of a pig being separated from a shoulder part and with cuts being marked in the upper arm part, including removing of the shoulder blade.

Therefore, stations to be prepared are limited to a charging station, a plurality of deboning stations, and a bone discharging station.

A single rectilinear transfer line is provided for transferring the meat block to be deboned (work) instead of a conventional looped transfer line along which the work is transferred in a hanged attitude with the ankle clamped.

A transfer path extending through the stations for transferring the work is divided for each station, fixed transfer paths are provided in other than deboning stations and movable paths capable of being lifted are provided in deboning stations. Each of the movable transfer paths is used as a means to move the work to a deboning position. When deboning process is finished, the movable transfer path holding the work boned is moved down to the initial vertical position of the movable transfer path, and the work is transferred to the next station. Thus, each of the movable transfer means is used as a means for transferring the work to the next station and also as a means to move the work to a deboning processing positions.

An intermittent feeding means is provided to transfer intermittently works held by the transfer means in each of the stations from station to station when the movable transfer means are positioned in their initial vertical positions, that is, when all of the transfer means are aligned.

It is preferable that said intermittent feeding means includes pushers for pushing the work from a preceding station of upstream side to succeeding station and a reciprocating mechanism to push and move back the pushers from the succeeding station to the preceding station after required processing to the work is finished.

The above invention describes the intermittent feeding means of the deboning system of meat of the present invention. The intermittent feeding means is not a circulation intermittent feeding means but a reciprocating means to transfer the work by one stroke of feeding from a station of upstream side to the succeeding station of downstream side and then the pusher for transferring the work is returned to the initial horizontal position of the pusher, leaving the work at the transferred position thereof, so that the transfer action to transfer a new work can be repeated.

It is preferable that said intermittent feeding means includes pushers for pushing the work to be transferred from a preceding station to the succeeding station, and an actuator for allowing the pushers to be reciprocated along the transfer paths, each of said pushers being composed such that a pushing member for pushing the work is provided and also is provided with a pushing member control mechanism by which the position of the pushing member is determined when pushing the work and the pushing member is released from the determined position when the pusher is returned with the work being left at the transferred position.

The above invention describes the construction of the intermittent feeding means of the deboning system of meat of the present invention. The intermittent feeding means is provided with a plurality of pushers each located in each station to be able to be pushed along the transfer line for transferring the work and an actuator to reciprocate pushers, and each of the pushers is composed such that it has a pushing member with its position being determined when the pusher is pushed forward to push the work and the pushing member is released from the position when the pusher is moved back leaving the work at the transferred position thereof.

It is preferable that said stations are arranged rectilinearly and equally spaced, the initial horizontal position of each of said pushers is equally spaced along the paths extending through the stations, and said plurality of deboning stations are a shoulder blade removing station and a succeeding humerus removing station.

The above invention describes the stations and transfer means provided in the stations. The stations of the deboning system of meat include a charging station, a plurality of deboning stations, i.e. a shoulder removing station and a humerus removing station, and a discharging station, the stations being arranged rectilinearly and equally spaced, that is, the width of each station in the transfer direction is equal.

The pushers each having its initial horizontal position on each transfer path between each station are also arranged rectilinearly and equally spaced.

With the configuration of the stations like this, an intermittent feeding means of simple construction can be used.

It is preferable that each of said fixed and movable transfer paths is composed of a pair of transfer rails such that a part of a bone of the meat block (work) can be inserted in the space between the transfer rails and the work can be moved along the transfer rails from a preceding station to the succeeding station intermittently by means of the intermittent feeding means.

The above invention describes the configuration of the transfer paths of the transfer means group of the deboning system of meat of the present invention. Each transfer path consists of a pair of rails to make it possible to hold constricted, or concaved part of a bone of the work by inserting the constricted part of the bone between the rails, instead of a damper for hanging the work as is used in a conventional deboning system of meat. A plurality of pairs of rails are arranged in the stations adjacent to each other, the pairs of rails including fixed pairs of rails and movable pairs of rails, a movable pair of rails being provided in each of deboning stations.

With the configuration like this, the work can be easily held by the pair of rails by inserting it to the space between the rails in the charging station, the work can be moved by a small force, thus the work can be transferred from station to station by means of the intermittent feeding means and pushers along the pairs of transfer rails which are provided adjacent to each other.

It is preferable that said intermittent feeding means includes a plurality of pushers connected the actuator, the actuator being able to reciprocate the pushers for pushing the work inserted in the space between the transfer rails to move it from the initial horizontal position on the transfer path in a preceding station to the initial horizontal position on the transfer path in the succeeding station, the pushers being transferred simultaneously between adjacent stations by one stroke action of the actuator, the pushers being returned to their initial horizontal position by one return action of the actuator leaving the work at the transferred position.

The above invention describes the intermittent feeding means of the deboning system of the present invention. The intermittent feeding means consists of an actuator capable of reciprocal actuation and three pushers connected to the actuation rod of the actuator, the pushers are connected to each other with a plurality of connecting rods of equal length.

Each of the connecting rods has length equal to the width of each station in the transfer direction.

The pushing member of each of the three pushers is provided at nearly right angle to the transfer direction to push the work by the forward actuation of the actuator, and the three pushers are returned to their initial horizontal positions by the return actuation of the actuator to move back the pushing member away from works transferred. The pushers are prepared for next transferring by returning to their initial horizontal positions.

Thus, deboning can be performed sequentially thorough the charging station, shoulder blade removing station, humerus removing station, and bone discharging station.

It is preferable that the transfer means positioned in the shoulder blade removing station with the work held by the transfer means is moved from the initial vertical position of the transfer means to a shoulder blade removing position, where the joint of the shoulder blade is destructed by pushing the back face of the meat part around the humerus in a direction and pushing the end part of the shoulder blade in the opposite direction, and the restricted part of the shoulder blade slanted forward is held by a gate-like shaped chuck and the shoulder blade is ripped off by drawing down the chuck.

The above invention describes the construction of a section to remove the shoulder blade from the work having cuts marked around the shoulder blade. The work transferred from the charging station via the fixed transfer path in the charging station to the movable path in the shoulder blade removing station is lifted to the shoulder blade removing position by lifting the movable path to depart from the initial vertical position of the movable path in order to remove the shoulder blade. After the shoulder blade is removed, the movable transfer path is returned to its initial vertical position with the work disposed of the shoulder blade being held by the movable path, then the work is transferred to the next humerus removing station in the succeeding transfer step by means of the intermittent feeding means.

It is preferable that a meat separator with which measurement of the length of humerus and ripping off of meat from the humerus are performed in conjunction with the movement of the transfer means when the transfer means positioned in the humerus removing station with the work held by the transfer means is moved from the initial vertical position of the transfer means to a humerus removing position, and a pair of rotary round cutters for marking an cut to a middle part of the caput of the humerus, are provided.

The above invention describes the process of deboning of the work held by the movable transfer path in the humerus removing station to remove meat from the humerus. In this case also the movable transfer path received the work form the preceding station of upstream side is lifted to the humerus removing position by lifting the movable path to depart from the initial vertical position of the movable path as is in the shoulder removing station. When the work is lifted by lifting the movable transfer path, ripping off of meat from the humerus and measurement of the length of humerus are performed in conjunction with lifting of the movable transfer path. Then, cutting of meat at an intermediate part of the caput of the humerus is done and then final cutting to separate meat is done, and then the humerus is transferred to the bone discharging station.

BEST MODE FOR EMBODIMENT OF THE INVENTION

The present invention will now be detailed with reference to the embodiment shown in the accompanying drawings. It is intended, however, that unless particularly specified, dimensions, materials, relative positions and so forth of the constituent parts in the embodiment shall be interpreted as illustrative only not as limitative of the scope of the present invention.

Figure 1:
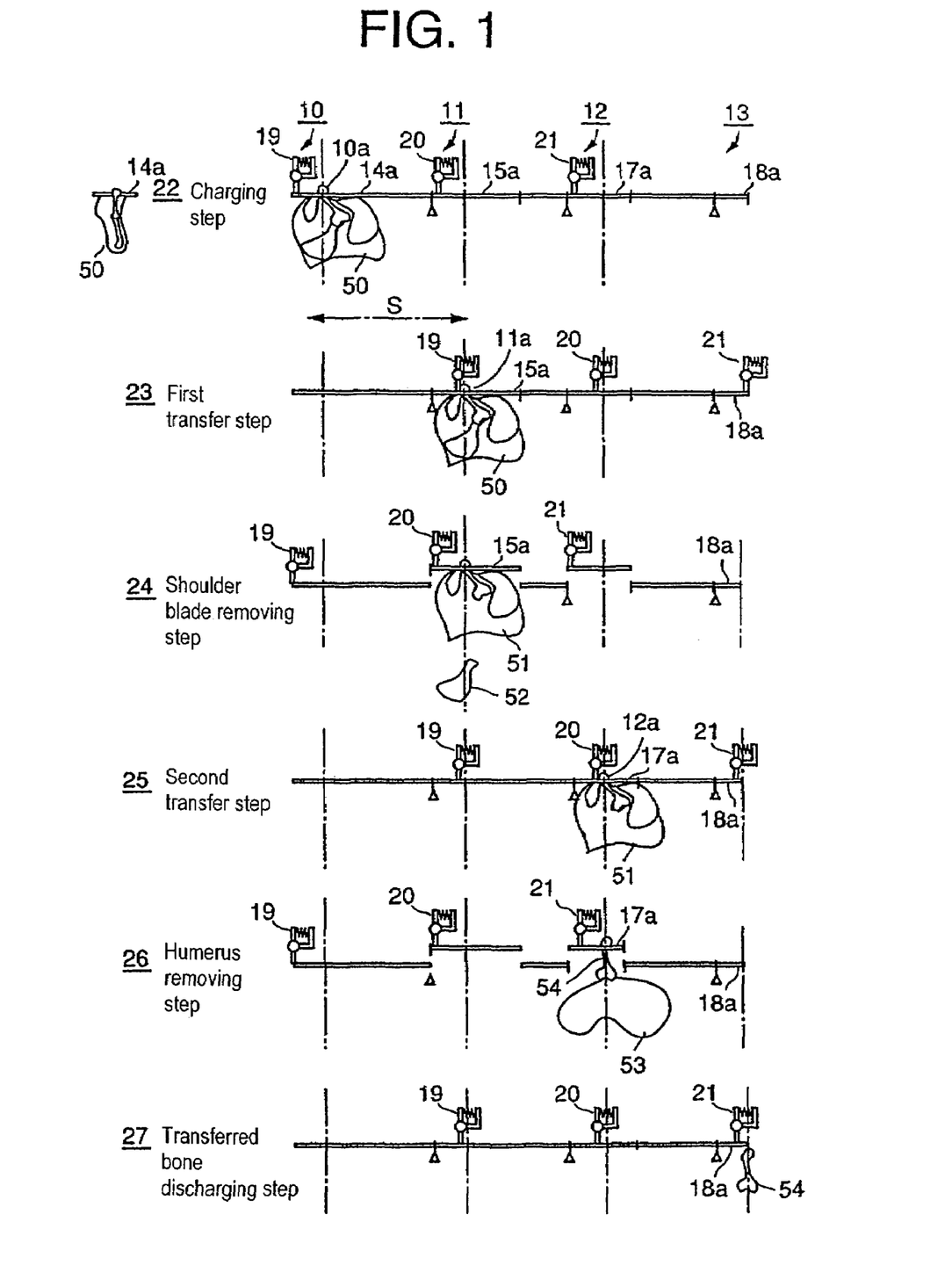
FIG. 1 is a diagrammatic illustration of the sequential operation of deboning in the deboning system of meat according to the present invention.
Figure 2:
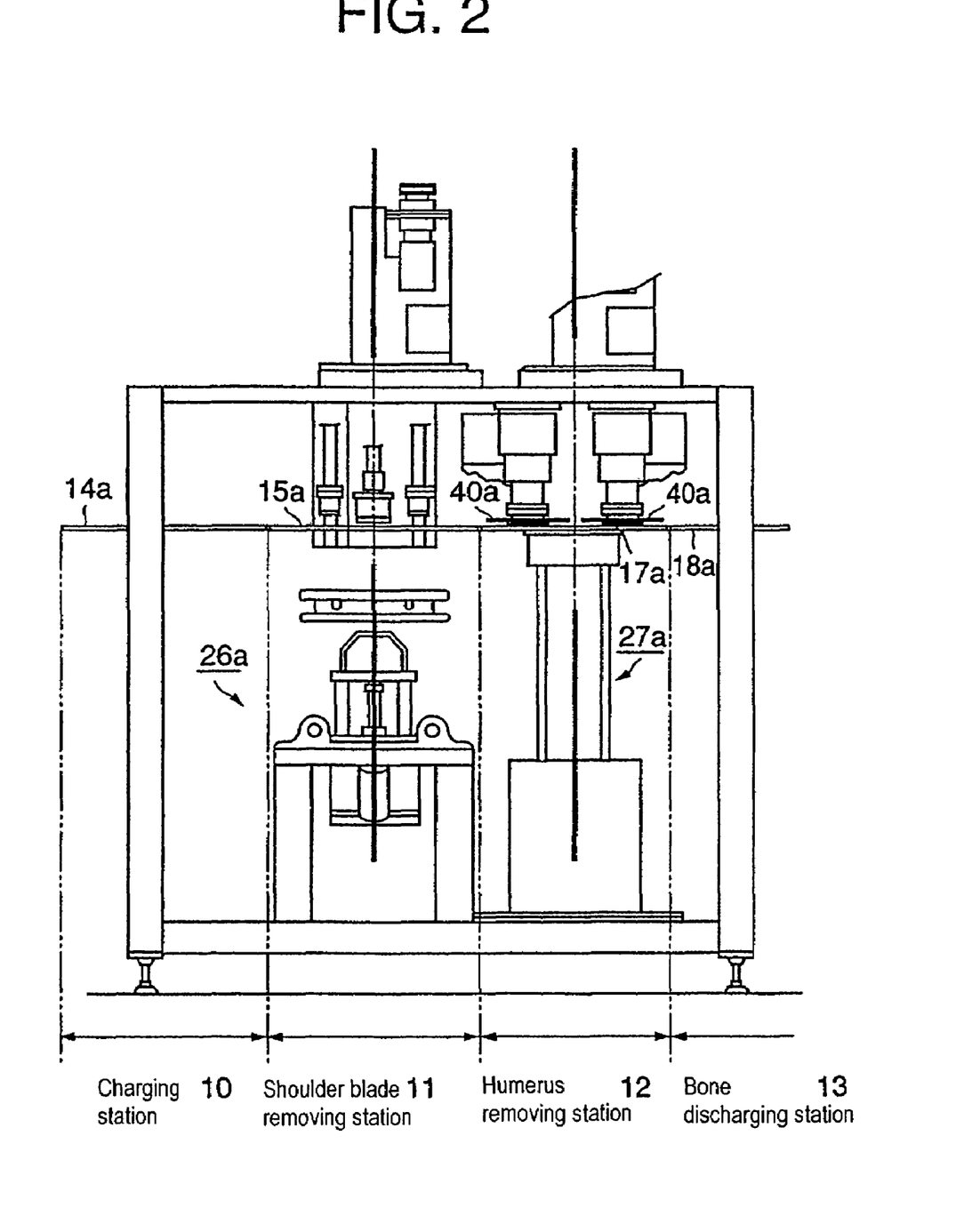
FIG. 2 is a side view of an embodiment of the deboning system of FIG. 1.
Figure 3:
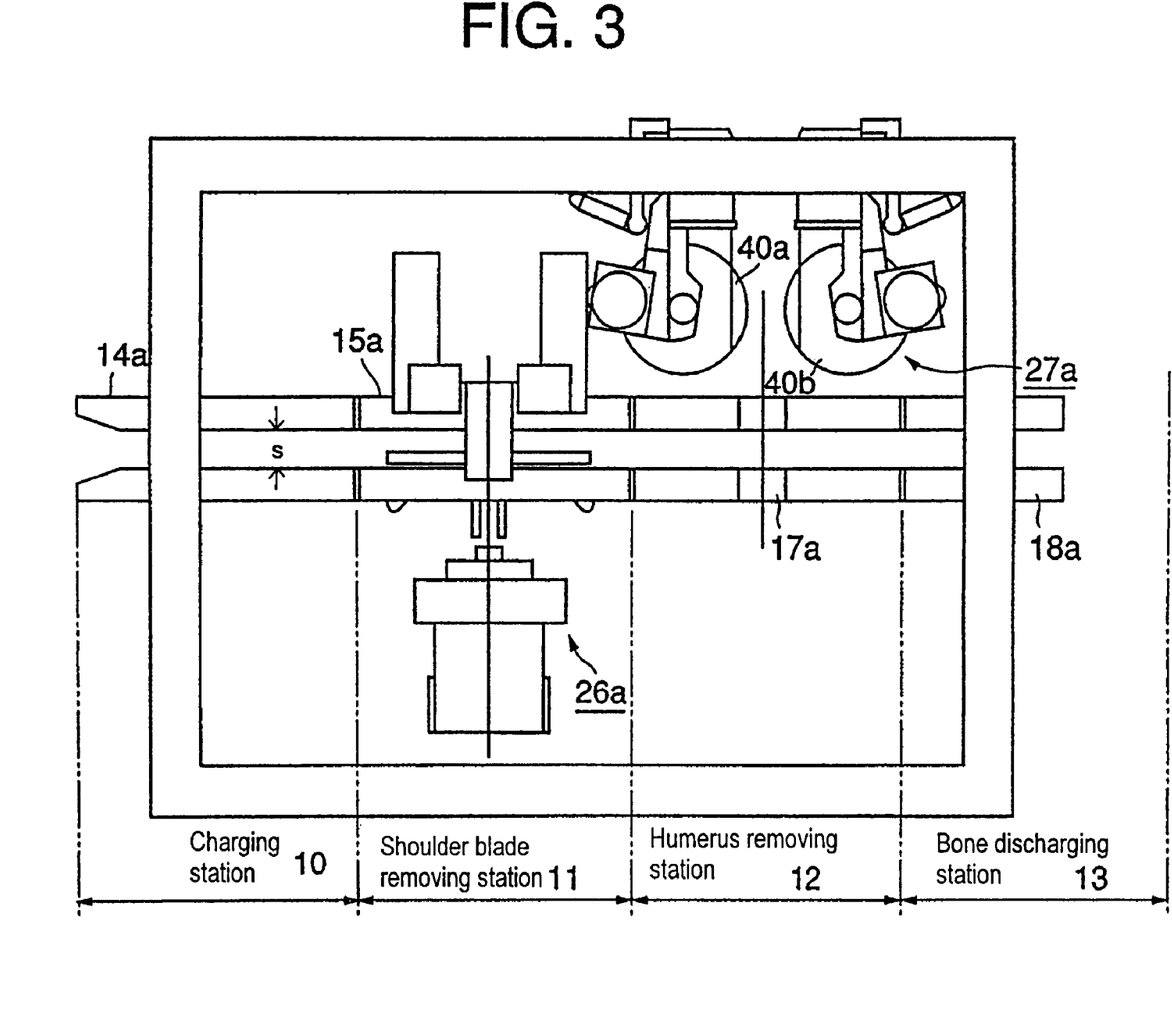
FIG. 3 is a plan view of the deboning system of FIG. 2.
Figure 4:
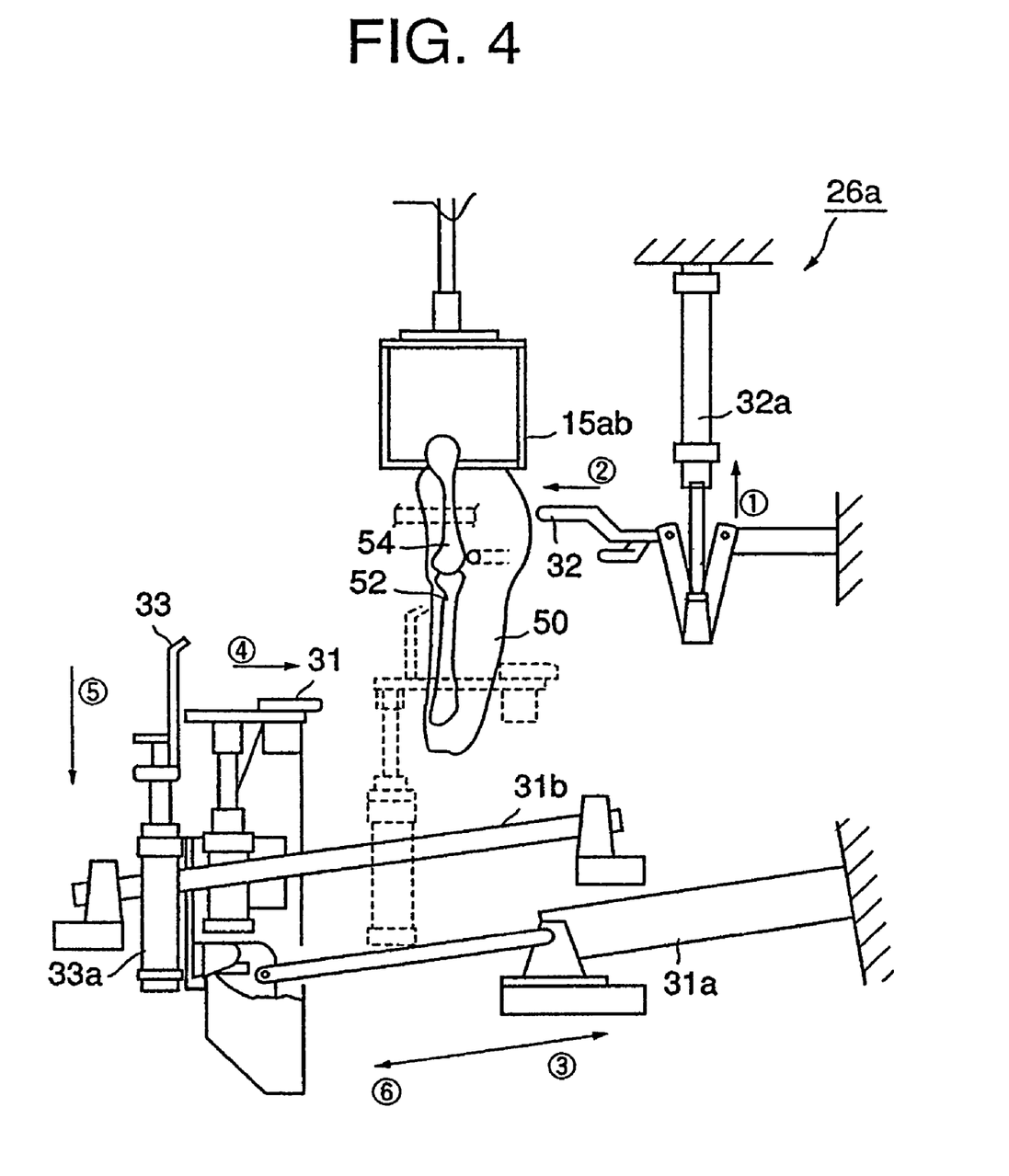
FIG. 4 is a view showing schematically the construction of the shoulder blade removing section of the deboning system of FIG. 2.
Figure 5:
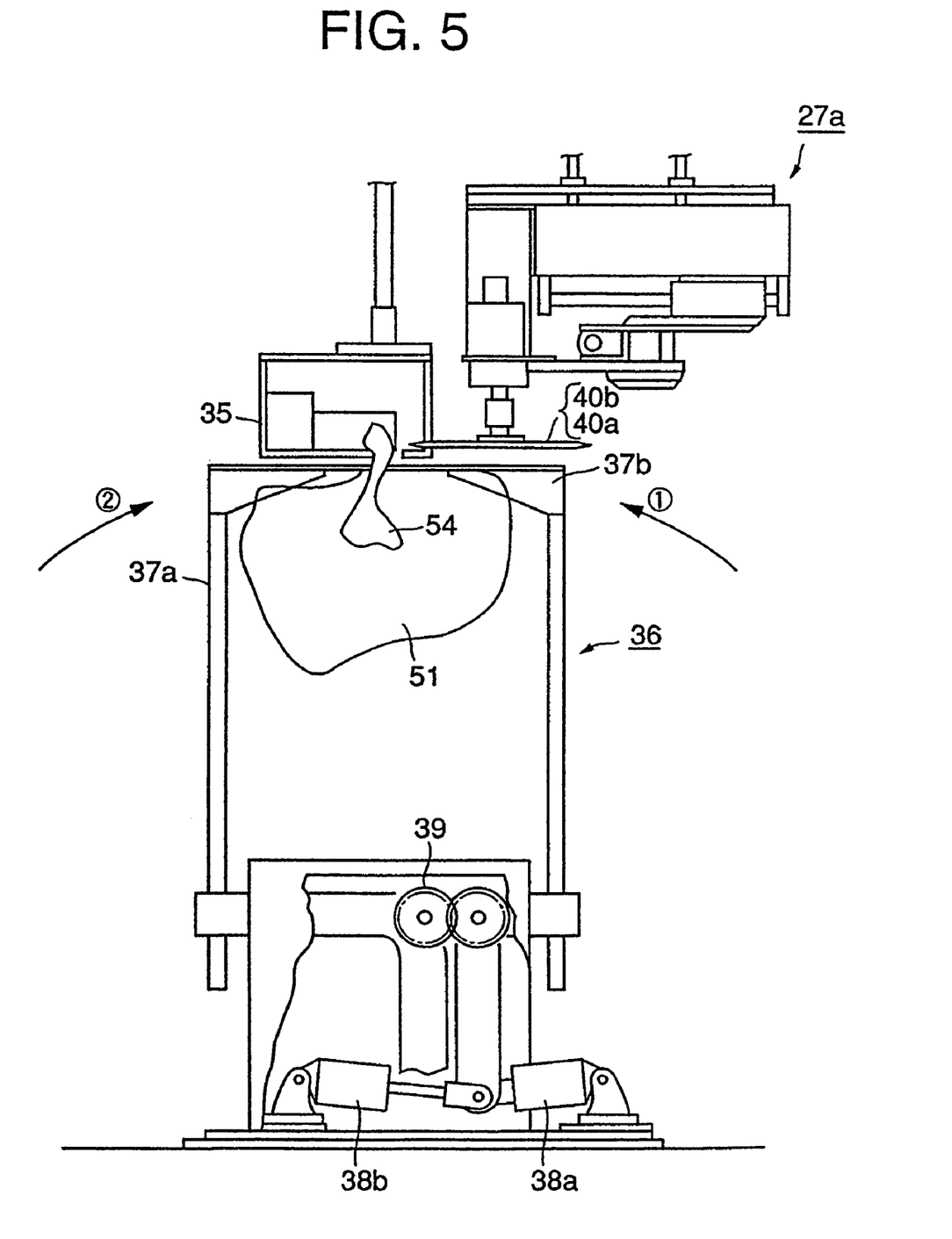
FIG. 5 is a view schematically showing the construction of the humerus removing section of the deboning system of FIG. 2.
Figure 6:
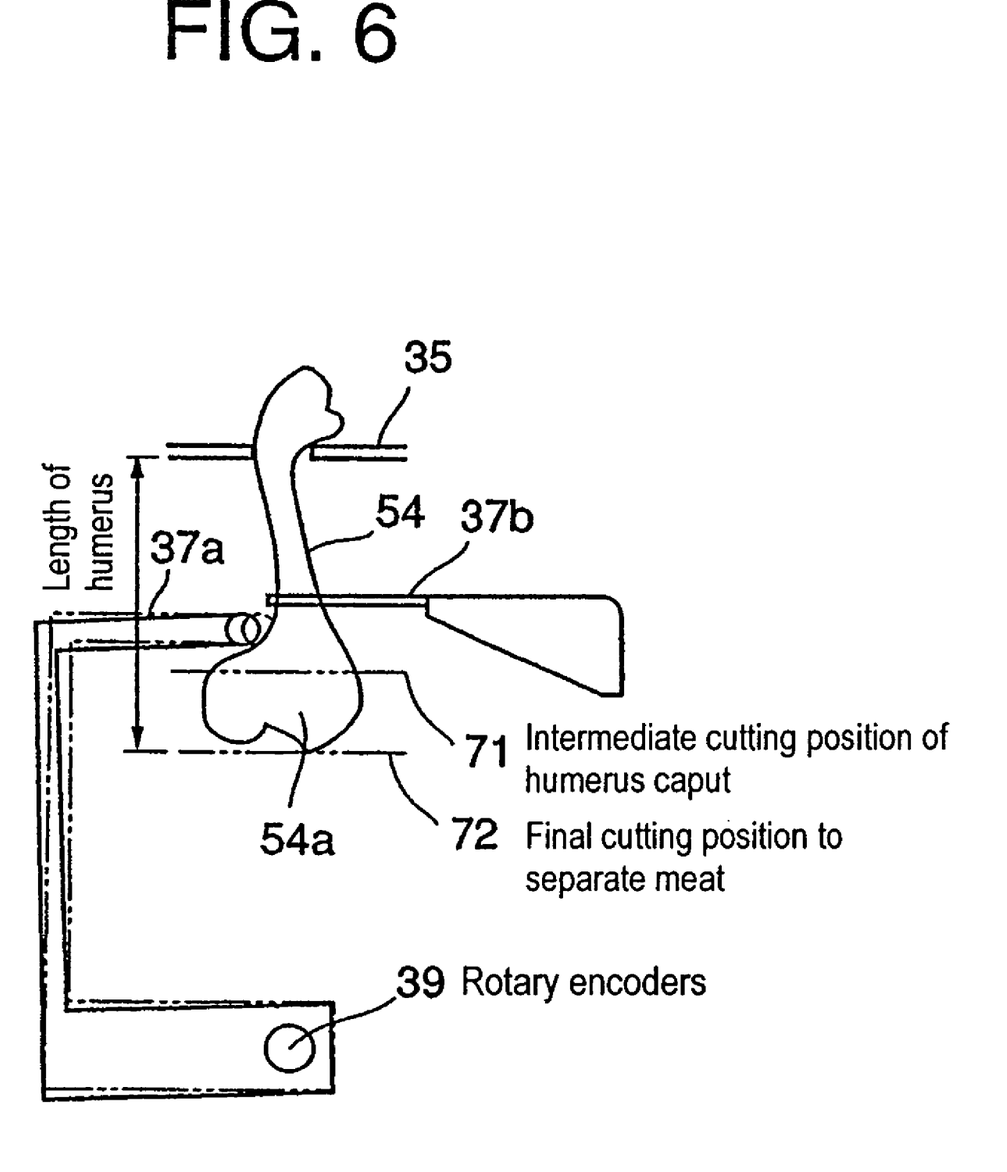
FIG. 6 is an illustration showing the relation of positions of the caput of humerus to determine the length of the humerus, position of intermediate cutting, and position of final cutting.

FIG. 1 is a diagrammatic illustration of the sequential operation of deboning in the deboning system of meat according to the present invention, FIG. 2 is a side view of an embodiment of the deboning system of FIG. 1, FIG. 3 is a plan view of the deboning system of FIG. 2. FIG. 4 is a view showing schematically the construction of the shoulder blade removing section of the deboning system of FIG. 2, FIG. 5 is a view schematically showing the construction of the humerus removing section of the deboning system of FIG. 2, and FIG. 6 is an illustration showing the relation of positions of the caput of humerus to determine the length of the humerus, the intermediate cutting position, and final cutting position.

Figure 7:
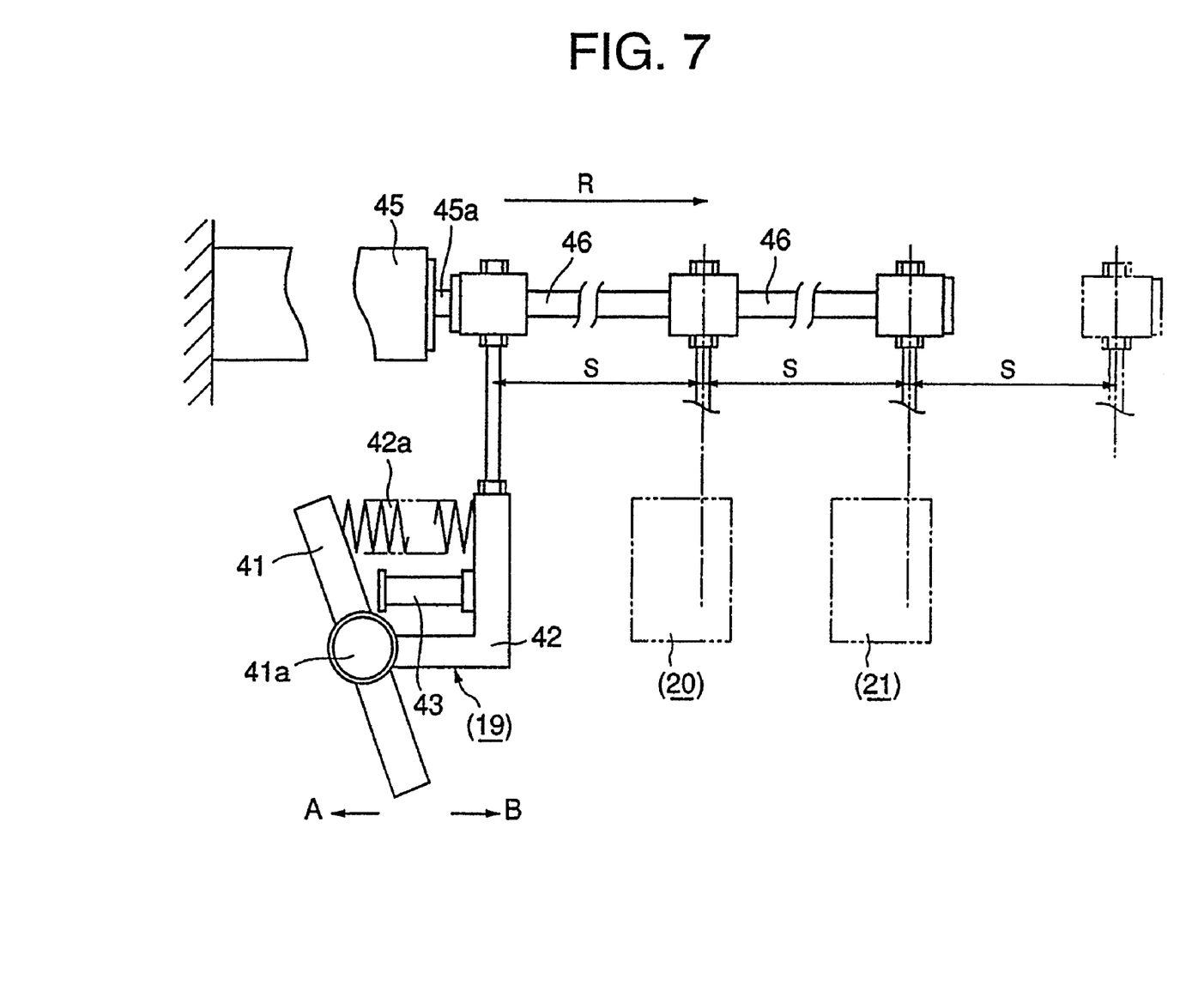
FIG. 7 is a view schematically showing the construction of an embodiment of the intermittent feeding means and the intermittent feeding mechanism of FIG. 1.

FIG. 7 is a view schematically showing the construction of an embodiment of the intermittent feeding means and the intermittent feeding mechanism of FIG. 1.

As shown in FIG. 1, in the deboning system of the present invention is established a deboning line along which a shoulder blade removing station 11 to rip off a shoulder blade is provided downstream from a charging station 10 at a spacing S, a humerus removing station 12 to rip off meat from a humerus is provided downstream from the station 11 at the same spacing S, and a bone discharging station 13 is provided downstream from the station 12 to discharge the humerus remained as a result of separation of meat from bones in the preceding stations.

In the charging station 10, the constricted part of the humerus of a meat block 50 consisting of a shoulder part with forearm bones removed (hereafter referred to as work), the meat block being one of blocks halved through the backbone and divided into five blocks, is inserted in the space between a pair of fixed transfer rails 14a to allow the work 50 to be hanged with the restricted part of the humerus clutched between the transfer rails 14a, the transfer rails extending over a length of S (see FIG. 3). This is a charging step 22.

Then, in a succeeding first transfer step 23, the work 50 inserted in the space between the fixed transfer rails 14a is pushed by an intermittent pusher 19, which is driven intermittently by means of an intermittent feeding mechanism described later, to be introduced to the space between a pair of movable transfer rails 15a provided in the next station 11 to be hanged there. When the work 50 is moved to the station 11, said pusher 19 is returned to the initial horizontal position in the charging station 10 leaving the work 50 at the initial horizontal position on the movable pair of transfer rails 15a.

Then, in a succeeding shoulder blade removing step 24, the movable pair of transfer rails 15a in the station 11 to which the work 50 has been introduced in the preceding step is lifted to a deboning processing position to rip off shoulder blade from the work 50, and the pair of transfer rails 15a is returned to its initial vertical position with a work 51 disposed of shoulder blade hanging from the pair of transfer rails 15a.

Then, in a succeeding second transfer step 25, the work 51 disposed of shoulder blade in the preceding step is pushed by means of an intermittent pusher 20 to be introduced to the space between a pair of transfer rails 17a in the succeeding humerus removing station 12 to be hanged there. Upon completion of the introduction, the pusher 20 is returned to its initial horizontal position in the shoulder removing station 11 leaving the work 51 in its initial horizontal position on the movable pair of transfer rails 17a.

Then, in a succeeding humerus removing step 26, the pair of movable transfer rails 17a in the station 12, the transfer rails 17a hanging the work 51 introduced in the preceding step, is lifted to a deboning processing position to rip off meat 53 from humerus, thus deboning is finished and the movable pair of transfer rails 17a is returned to its initial vertical position with humerus 54 hanging from the movable pair of transfer rails 17a.

Then, in a succeeding transferred bone discharging step 27, the humerus 54 is discharged by means of an intermittent pusher 21 to a discharging station 13. Upon completion of the discharging, the pusher 21 is returned to its original horizontal position.

Thus, deboning is finished through the charging step, first transfer step, shoulder blade removing step, second transfer step, humerus removing step, and transferred bone discharging step.

Said charging is done right after the pushers 19, 20, and 21 connected rectilinearly to be one piece by means of connecting bars and the connected pushers are returned simultaneously to the initial horizontal position of each of them to charge a next work, thus continuous deboning is possible.

The intermittent feeding mechanism comprises, as shown in FIG. 7, a pusher cylinder 45 constituting an actuator disposed so that the direction of actuation is in the direction of the transfer line R, pushers 19, 20, and 21 for transferring a work hanging at the initial horizontal position in each station to the succeeding station intermittently by a distance S by one stroke of pushing by means of the pusher cylinder 45, connecting bars 46, 46 for connecting the pushers rectilinearly at the same spacing S, an end pusher of the connected pushers being connected to an actuating rod 45a of the pusher cylinder 45.

As is viewed in FIG. 7, the mechanism is composed such that the pushers 19, 20, and 21 can push each work only in a direction of B, and when transferring each work intermittently, each work is moved in the direction B by the actuation of the pusher cylinder 45 by the distance S corresponding to one stroke of intermittent pushing, the distance S corresponding to the length of each station in the transfer direction.

The pushers 19, 20, and 21 are of the same construction, each of the pushers comprising a pusher lever 41 supported by a frame body 42 to be rotatable around a supporting point 41a, a stopper 43, and a return spring 42a. The pusher lever 41 is supported by the frame body 42 so that the rotation in the direction of arrow A is stopped by the stopper 43, although the pusher lever 41 is pulled by said return spring 42a.

With the construction like this, each pusher lever 41 of the pushers 19, 20, and 21 pushes each work (not shown in FIG. 7) positioned at the lower end part of each pusher lever 41 in the direction B contacting the upper part of each work to transfer each work to the succeeding station when the pusher cylinder 45 actuates to push the pushers. When the pusher cylinder 45 actuates to return the pushers, each pusher lever 41 rotates upon contacting with the upper part of each work in each preceding stations of upstream side against the spring force of the spring 42a to override them, so each of the pushers 42 is returned to its initial horizontal position.

As can be recognized from FIG. 1, when works (in FIG. 1, only one work being depicted) are positioned at the initial horizontal positions 10a, 11a, and 12a on the fixed pair of transfer rails 14a in the charging station, the movable pair of transfer rails 15a in the shoulder blade removing station, and the movable pair of transfer rails 17a in the humerus removing station respectively, the pushers 19, 20, and 21 push each work to transfer each work intermittently to each succeeding station 11, 12, and 13 respectively by the pushing operation of the intermittent transferring means.

As can be recognized from the representation of shoulder blade removing step 24 and humerus removing step 26 in FIG. 1, the movable pair of transfer rails 15a, 17a in the shoulder blade removing station 11 and humerus removing station 12 are lifted when performing deboning, so the transfer path is interrupted by the lifting, and the transferring of the work is impossible when deboning is performed.

FIG. 2 is a side view of an embodiment of the deboning system shown in FIG. 1, and FIG. 3 is a plan view of the deboning system of FIG. 2.

The drawings show the construction of an embodiment of the deboning system of meat explained with reference to FIG. 1.

As viewed in FIG. 2 showing the side view of the embodiment, the system is composed of a discharging station 10, a shoulder blade removing station 11, a humerus removing station 12, and a bone discharging station 13, each station being arranged rectilinearly with the span of each station being the same in the direction of transfer of the work to be deboned. Thus, a deboning line is formed in a straight line having both ends.

In the present invention, an upper arm and picnic shoulder part of a half block halved along the backbone preprocessed to remove boston butt, forearm bones, and the joint between the forearm bones and humerus and to mark cuts around the shoulder blade, is charged to the system as a work 50.

A deboning line which is relatively short in length is composed, in which shoulder blade ripping-off is performed in the shoulder blade removing station 11, meat is ripped off from humerus 54 from the work 51, which is disposed of the shoulder blade, in the humerus removing station 12, and the remaining humerus 54 is discharged at the bone discharging station 13.

As is viewed in FIG. 1, a pair of fixed transfer rails 14a provided in the charging station 10, a pair of movable transfer rails 15a provided in the shoulder blade removing station 11, a pair of movable transfer rails 17a provided in the humerus removing station 12, and a pair of fixed transfer rails 18a provided in the bone discharging station 13, are arranged rectilinearly such that the movable pairs of transfer rails can be moved to depart from the initial vertical position, the constricted part of the humerus of a work is inserted to the space between the rails so that the work is hanged from the rails to be transferred through the transfer line, and deboning and ripping off of meat are performed in the shoulder blade removing station 11 and humerus removing station 12 respectively.

When performing deboning, the movable pair of transfer rails 15a, 17a are lifted to be positioned at each corresponding deboning section with the work hanging from the rails and moved down to their initial vertical positions when corresponding deboning operation is finished.

As is viewed in FIG. 2 and FIG. 3, the shoulder blade removing station 11 is provided with a shoulder blade ripping section 26a, and the humerus removing station 12 is provided with a humerus deboning section 27a.

FIG. 4 shows schematically the construction of the shoulder blade ripping section 26a where the shoulder blade 52 is removed from the work 50 having cuts marked around the shoulder blade 52. The work 50 is transferred from the preceding charging station 10 to the movable pair of transfer rails 15a in the shoulder blade removing station 11 via the fixed pair of transfer rails 14a, then a clamper 15ab which is integrated with the movable pair of transfer rails 15a is lifted to the shoulder blade ripping off position.

As is viewed in FIG. 4, the shoulder blade ripping section 26a comprises a meat pushing lever 32 for pushing the back face of the meat part around the humerus 54 of the work 50 held in a hanged attitude in a direction ② by means of an actuator 32a which lifts its moving rod in a direction ①, a shoulder blade pushing plate 31 for pushing the lower part of the work in a direction ④ in order to bring the shoulder blade 52 to be slanted forward, an actuator 31a for pulling the shoulder blade pusher 31 in the direction ③, a linear guide 31b for guiding the shoulder blade pushing plate 31 to be moved in the direction ④, and a gate-like shaped chuck 33 capable of grabbing the restricted part of the shoulder blade 52 slanted forward and capable of being moved down in a direction ⑤ by means of an actuator 33a.

The upper joint of the shoulder blade 52 is destructed by pushing the shoulder blade with said shoulder blade pushing plate 31 to slant the shoulder forward. Then, the restricted part of the shoulder blade 52 is held securely by the chuck 33 and ripped off by moving the chuck 33 by means of the actuator 31a in the direction ⑥, the chuck 33 being guided by the linear guide 31b.

FIG. 5 is a view schematically showing the construction of the humerus removing section 27a of the deboning system of FIG. 2, and FIG. 6 is an illustration showing the relation of positions of the caput of humerus to determine the length of the humerus, position of intermediate cutting 71, and position of final cutting 72 for separating meat.

In the humerus removing section 27a, ripping off of meat from the humerus 54 of the work 51 which is preprocessed to remove forearm bones and joint between forearm bones and humerus before charging to the charging station 10 and disposed of shoulder blade 52 in the preceding station 11, measurement of the height position of the caput 54a of the humerus, cutting 71 of meat at an intermediate position of the humerus caput, and final cutting 72 to separate meat from the humerus are performed. In the section 27a, each of rocking levers 37a, 37b of a meat separator 36 are rotated to pinch the humerus, a damper 35 which is integrated with the movable transfer path 17a is lifted, and meat is scraped off from the humerus 54 as the damper 35 is moved up to lift the movable transfer path 17a relative to the meat separator 36. The rocking levers 37a, 37b pinching the humerus moves to open as the work is lifted because the humerus increases in thickness toward the caput thereof, and the position of the top of the caput of the humerus is determined by the change of the opening of the rocking levers 37a, 37b of the meat separator 36 by measuring the rotation angle by rotary encoders 39 in order to determine the position of intermediate cutting and final cutting, and the cutting 71 of meat at an intermediate position of the humerus caput and final cutting 72 to separate meat from the humerus are performed by horizontal rotary round cutters 40a, 40b.

Rotation of the rocking levers 37a, 37b of the meat separator 36 in directions ①, ② is done by means of actuators 38a, 38b by pushing the lower ends of levers supported to the meat separator 36 to rotate around the center of the encoders 39 respectively as can be understood from FIG. 5.

INDUSTRIAL APPLICABILITY

The present invention provides such a small-sized deboning system of space-saving and low cost suitable for small-to-medium scale food processing factories by that has the function of implementing highly necessary processing by limiting processing range to a minimum. Particularly, by adopting a movable pair of transfer rails, it becomes possible to constitute a low cost deboning system, and by adopting an intermittent feeding mechanism and pushers to transfer the work, i.e. meet block to be deboned, the work can be transferred sequentially to the succeeding station and deboning operation can be performed sequentially and stably.

The invention claimed is:

1. A deboning system for deboning a picnic shoulder part of a meat block of a dressed carcass halved along the backbone while the meat block is suspended, the system comprising:
   a charging station for loading the meat block;
   a plurality of deboning stations for deboning the meat block;
   a bone discharging station; and
   a group of transfer means comprising a plurality of transfer oaths including fixed transfer paths, movable transfer paths, and an intermittent feeding means for pushing the meat block through said stations,
   wherein the meat block is suspended at each of said stations,
   wherein the movable transfer paths are provided in the deboning stations, said movable paths being movable to move the suspended meat block at each of the deboning stations on each of the movable transfer oaths to a respective deboning section provided in each of the deboning stations to perform respective deboning operation,
   wherein said intermittent feeding means intermittently pushes the meat block suspended from a preceding station to a succeeding station, and
   wherein said intermittent feeding means includes pushers for pushing the meat block from the preceding station to the succeeding station and a reciprocating mechanism for pushing and moving back the pushers from the succeeding station to the preceding station.

2. A deboning system according to claim 1, wherein said stations are arranged rectilinearly and equally spaced, with an initial horizontal position of each of said pushers equally spaced along the paths extending through the stations, and said plurality of deboning stations are a shoulder blade removing station and a succeeding humerus removing station.

3. A deboning system according to claim 1, wherein said plurality of deboning stations include a shoulder blade removing station having a gate-like shaped chuck, the transfer means positioned in the shoulder blade removing station is movable from an initial vertical position of the transfer means to a shoulder blade removing position, where the joint of the shoulder blade is destructed by pushing the back face of the meat part around the humerus in one direction and pushing the end part of the shoulder blade in the opposite direction, and a restricted part of the shoulder blade slanted forward is held by said gate-like shaped chuck and drawing down the chuck rips off the shoulder blade.

4. A deboning system according to claim 1, wherein said plurality of deboning stations include a humerus removing station that has a meat separator with which measurement of the length of humerus and ripping off of meat from the humerus are performed in conjunction with the movement of the transfer means when the transfer means positioned in the humerus removing station with the meat block held by the transfer means is moved from an initial vertical position of the transfer means to a humerus removing position, and a pair of rotary round cutters for marking a cut to a middle part of the caput of the humerus.

5. A deboning system for deboning a picnic shoulder part of a meat block of a dressed carcass halved along the backbone while the meat block is suspended, the system comprising:
   a charging station for loading the meat block;
   a plurality of deboning stations for deboning the meat block;
   a bone discharging station; and
   a group of transfer means comprising a plurality of transfer paths including fixed transfer paths, movable transfer paths, and an intermittent feeding means for pushing the meat block through said stations,
   wherein the meat block is suspended at each of said stations,
   wherein the movable transfer paths are provided in the deboning stations, said movable paths being movable to move the suspended meat block at each of the deboning stations on each of the movable transfer paths to a respective deboning section provided in each of the deboning stations to perform respective deboning operation,
   wherein said intermittent feeding means intermittently pushes the meat block suspended from a preceding station to a succeeding station, and
   wherein said intermittent feeding means includes pushers for pushing the meat block to be transferred from the preceding station to the succeeding station, and an actuator for allowing the pushers to be reciprocated along the transfer paths, each of said pushers including a pushing member for pushing the meat block, and a pushing member control mechanism by which the position of the pushing member is determined when pushing the meat block and the pushing member is released from a determined position when the pusher is returned with the meat block left at the transferred position.

6. A deboning system for deboning a picnic shoulder part of a meat block of a dressed carcass halved along the backbone while the meat block is suspended, the system comprising:
   a charging station for loading the meat block;
   a plurality of deboning stations for deboning the meat block;
   a bone discharging station; and
   a group of transfer means comprising a plurality of transfer paths including fixed transfer paths, movable transfer paths, and an intermittent feeding means for pushing the meat block through said stations,
   wherein the meat block is suspended at each of said stations,
   wherein the movable transfer paths are provided in the deboning stations, said movable paths being movable to move the suspended meat block at each of the deboning stations on each of the movable transfer paths to a respective deboning section provided in each of the deboning stations to perform respective deboning operation,
   wherein said intermittent feeding means intermittently pushes the meat block suspended from a preceding station to a succeeding station, and
   wherein each of said fixed and movable transfer paths is composed of a pair of spaced-apart transfer rails such that a bone part of the meat block is insertable between a space between the transfer rails and the bone part is movable along the transfer rails from the preceding station to the succeeding station intermittently with the intermittent feeding means.

7. A deboning system according to claim 6, wherein said intermittent feeding means includes an actuator and a plurality of pushers connected to the actuator, the actuator reciprocating the pushers for pushing the bone part inserted in the space between the transfer rails from the preceding station to the succeeding station, the pushers being transferred simultaneously between adjacent stations by one stroke action of the actuator, the pushers being returned to their respective initial horizontal position by one return action of the actuator while leaving the meat block at the transferred position.

* * * * *